US011983552B2

(12) United States Patent
Dubba et al.

(10) Patent No.: US 11,983,552 B2
(45) Date of Patent: May 14, 2024

(54) METHOD OF REMOTE ACCESS

(71) Applicant: Blue Prism Limited, Warrington (GB)

(72) Inventors: Krishna Sandeep Reddy Dubba, Warrington (GB); Jacques Cali, Warrington (GB)

(73) Assignee: BLUE PRISM LIMITED, Warrington (GB)

( * ) Notice: Subject to any disclaimer, the term of this patent is extended or adjusted under 35 U.S.C. 154(b) by 0 days.

(21) Appl. No.: 17/144,640

(22) Filed: Jan. 8, 2021

(65) Prior Publication Data

US 2021/0216336 A1 Jul. 15, 2021

(30) Foreign Application Priority Data

Jan. 10, 2020 (GB) ..................................... 2000363

(51) Int. Cl.
*G06F 9/451* (2018.01)
*G06F 3/0481* (2022.01)
(Continued)

(52) U.S. Cl.
CPC ............ *G06F 9/452* (2018.02); *G06F 3/0481* (2013.01); *G06N 20/00* (2019.01); *H04L 67/01* (2022.05); *H04L 67/02* (2013.01)

(58) Field of Classification Search
CPC .... G06F 9/452; G06F 3/0481; G06F 21/6245; G06N 20/00; H04L 67/02; H04L 67/42; H04L 67/025
(Continued)

(56) References Cited

U.S. PATENT DOCUMENTS 6,256,637 B1 7/2001 Venkatesh et al.
7,962,620 B2 6/2011 Safari et al.
(Continued)

FOREIGN PATENT DOCUMENTS

CN 101430644 A 5/2009
EP 4088211 A1 11/2022
(Continued)

OTHER PUBLICATIONS

China National Intellectual Property Administration, Office Action, CN Patent Application No. 201480045821.5, dated Jul. 3, 2019, 14 pages.
(Continued)

*Primary Examiner* — June Sison
*Assistant Examiner* — Mariegeorges A Henry
(74) *Attorney, Agent, or Firm* — BakerHostetler

(57) ABSTRACT

The present invention relates to a method of preventing sensitive data received via a remote access protocol from being output to a human operator. The method comprises receiving, from a remote server via a remote access protocol, a user interface of an application executing on the remote server; receiving, from the remote server, a text-based representation of the application; identifying sensitive data in the user interface and/or the text-based representation of the application using one or more preselected filters; modifying the user interface to remove the identified sensitive data; outputting the modified user interface to one or more output peripherals of a computer for receipt by the human operator.

15 Claims, 8 Drawing Sheets

(51) Int. Cl.
*G06N 20/00* (2019.01)
*H04L 67/01* (2022.01)
*H04L 67/02* (2022.01)

(58) Field of Classification Search
USPC .............................................. 709/203; 726/1
See application file for complete search history.

(56) References Cited

U.S. PATENT DOCUMENTS

| | | | |
|---|---|---|---|
| 7,971,091 | B1 | 6/2011 | Bingham et al. |
| 8,826,068 | B2 | 9/2014 | Somendra |
| 9,600,350 | B2 | 3/2017 | Jooste |
| 10,055,611 | B2 | 8/2018 | Patel et al. |
| 10,799,718 | B2* | 10/2020 | Smith ..................... G06F 9/542 |
| 10,977,155 | B1* | 4/2021 | Muras ................. G06F 11/3608 |
| 11,586,453 | B2* | 2/2023 | Moss .................. G06F 9/45533 |
| 2002/0147505 | A1 | 10/2002 | Beck et al. |
| 2004/0088717 | A1 | 5/2004 | Chen et al. |
| 2005/0138626 | A1 | 6/2005 | Nagami et al. |
| 2005/0149868 | A1 | 7/2005 | Katayama et al. |
| 2008/0163239 | A1 | 7/2008 | Sugumar et al. |
| 2009/0319990 | A1* | 12/2009 | Fan ........................ G06N 3/126 717/116 |
| 2010/0023517 | A1 | 1/2010 | V. et al. |
| 2010/0027896 | A1 | 2/2010 | Geva et al. |
| 2010/0257399 | A1 | 10/2010 | Brown et al. |
| 2011/0119388 | A1 | 5/2011 | Attanasio et al. |
| 2011/0289417 | A1 | 11/2011 | Schaefer et al. |
| 2012/0151063 | A1 | 6/2012 | Yang et al. |
| 2012/0151480 | A1 | 6/2012 | Diehl et al. |
| 2012/0331342 | A1 | 12/2012 | Behrendt et al. |
| 2013/0329023 | A1 | 12/2013 | Suplee et al. |
| 2014/0118239 | A1 | 5/2014 | Phillips |
| 2014/0245115 | A1 | 8/2014 | Zhang et al. |
| 2014/0282978 | A1 | 9/2014 | Lerner et al. |
| 2015/0012919 | A1 | 1/2015 | Moss et al. |
| 2015/0106463 | A1 | 4/2015 | Kruglick |
| 2015/0278534 | A1 | 10/2015 | Thiyagarajan et al. |
| 2015/0319178 | A1* | 11/2015 | Desai ..................... G06F 9/451 726/1 |
| 2019/0014175 | A1 | 1/2019 | Malachowski et al. |
| 2020/0012671 | A1* | 1/2020 | Walters ................. G06F 21/552 |
| 2020/0012811 | A1* | 1/2020 | Walters ..................... G06F 9/54 |
| 2021/0216336 | A1 | 7/2021 | Dubba et al. |

FOREIGN PATENT DOCUMENTS

| | | |
|---|---|---|
| JP | 2009-151467 A | 7/2009 |
| JP | 2012-155219 A | 8/2012 |
| JP | 2013-041352 A | 2/2013 |

OTHER PUBLICATIONS

Communication pursuant to Article 94(3) EPC for European Patent Application No. EP 14741937.8, dated Jun. 30, 2017, 7 Pages.
Japan Patent Office, Notice of Reasons for Refusal, JP Patent Application No. 2018-194709, dated Apr. 7, 2020, six pages.
PCT International Search Report and Written Opinion, PCT Application No. PCT/GB2021/050047, dated Mar. 16, 2021, 14 pages.
Richardson, T. et al., "The Remote Framebuffer Protocol," Internet Engineering Task Force (IETF), Mar. 2011, pp. 1-39.
The Intellectual Property Office of the United Kingdom, Office Action, GB Patent Application No. 2000363.8, dated Jun. 12, 2020, three pages.
W3C, "Document Object Model (DOM) Level 3 Core Specification," Version 1.0, W3C Recommendation, Apr. 7, 2004, pp. 1-216.

* cited by examiner

METHOD OF REMOTE ACCESS

CROSS REFERENCE TO RELATED APPLICATIONS

This application claims the priority of United Kingdom Application No. 20000363.8 filed Jan. 10, 2020, which is incorporated herein by reference.

TECHNICAL FIELD

The present invention relates to a method of preventing sensitive data received via a remote access protocol from being output to a human operator.

BACKGROUND

Remote access protocols allow a human operator to remotely interact with an application running on a remote server. Remote interaction is achieved by such protocols by sending the user interface (UI) of the application from the remote server to the human operator's computer. Using the received UI, the human operator is able to interpret the actions that the application can perform and the controls that are available in the application. The human operator is then able to decide which actions should be performed by the application and input the appropriate control signals into their computer. These control signals are subsequently sent from the human operator's computer to the remote server, where the desired actions are performed.

There are several known remote access protocols. One example is the remote framebuffer (RFB) protocol, which sends rendered graphical user interface (GUI) images from the remote server to the human operator's computer. A second example of a remote access protocol is the remote desktop protocol (RDP) by Microsoft. RDP is similar to the RFB protocol except that, instead of sending the rendered GUI image from the remote server to the human operator's computer, data for rendering the GUI image are sent.

A problem with these remote access protocols is that the UI received from the remote server to the human operator's computer can include sensitive data (i.e. personal information, financial information, medical information). Sensitive data received at the human operator's computer are problematic if output to a human operator because they may not be authorised to view the sensitive data. Further, there is a risk of a data breach via the human operator. Data breaches of sensitive data can result in the accidental or unlawful destruction, loss, alternation, unauthorised disclosure of, or access to, sensitive data, leading to significant human consequences. Moreover, access by a human operator to the sensitive data may be unlawful under the regulations of various jurisdictions. Therefore, a method for preventing sensitive data from being output to the human operator is desirable.

SUMMARY

The present invention is defined by the independent claims, with further optional features being defined by the dependent claims.

In a first aspect of the invention, there is provided a computer-implemented method of preventing sensitive data received via a remote access protocol from being output to a human operator, the method comprising: receiving, from a remote server via a remote access protocol, a user interface of an application executing on the remote server; determining, or receiving from the remote server, a text-based representation of the application; identifying sensitive data in the user interface and/or the text-based representation of the application using one or more preselected filters; modifying the user interface to remove the identified sensitive data; outputting the modified user interface to one or more output peripherals of a computer for receipt by the human operator. In this way, sensitive data is prevented from being output to a human operator using the UI of the application and/or a text-based representation of the application.

In one embodiment, the remote access protocol is a remote framebuffer protocol. For example, the remote server may be a virtual network computing (VNC) server, and the computer may be a VNC client. In this embodiment, the received user interface is in the form of an image of the user interface, the step of modifying comprising modifying the image of the user interface, and the step of outputting comprising outputting the modified image of the user interface. Thus, the method can be used with the remote framebuffer protocol.

In another embodiment, the remote access protocol is a remote desktop protocol. In this embodiment, the received user interface is in the form of data for rendering an image of the user interface, the step of modifying comprising modifying the data for rendering an image of the user interface, and the step of outputting comprises outputting the modified data to render an image of a modified user interface. Thus, the method can be used with the remote desktop protocol.

The text-based representation of the application may comprise text extracted from the user interface and/or the application. Additionally or alternatively, the text-based representation of the application may comprise a programmatic representation of the application. In some embodiments, the programmatic representation comprises a document object model of the application. The text-based representation of the application is used to identify additional sensitive data that may not have been identified using the user interface of the application. A particular advantage of using a text-based representation of the application in particular is that information underlying the application can be utilised for identifying sensitive data, meaning that sensitive data is identified more accurately.

When the sensitive data is in the form of text, the preselected filter comprises a rule, for example a regular expression matching rule. Alternatively, the preselected filter comprises a machine learning model that is configured to identify text. These alternatives both allow sensitive data in the form of text to be identified and therefore prevented from being output to the human operator.

When the sensitive data is in the form of an image, the preselected filter comprises a machine learning model that is configured to identify an image. This allows sensitive data in the form of an image to be identified and therefore prevented from being output to the human operator.

The method may further comprise, prior to the step of determining, or receiving from the remote server, preselecting one or more filters based on sensitive data in the application. The sensitive data may include personal information such as one or more of: a name, an address, a date of birth, a telephone number, an identification document image, a facial image. Additionally or alternatively, the sensitive data may include financial information such as one or more of: credit card numbers, bank numbers. Additionally or alternatively, the sensitive data may include medical information. This allows the one or more filters to be customised based on the type of sensitive data expected to be in the application.

The modified user interface may be configured for interaction with the human operator via one or more input peripherals of the computer. This is so that the human operator can input controls into the remote server via the remote access protocol. The unmodified user interface is not output to the to one or more output peripherals of the computer in order to ensure that the sensitive data cannot be leaked by the human operator.

Typically for the remote framebuffer protocol and the remote desktop protocol, the user interface is a graphical user interface. Moreover, the step of receiving a user interface comprises receiving a user interface of a desktop of the remote server, the user interface of the application forming a portion of the user interface of the desktop. The application may be a web browser, although any type of desktop application is suitable for use with the method.

In a second aspect of the invention, there is provided a computer program comprising instructions which, when the program is executed by a processor, cause the processor to carry out the method of the first aspect of the invention.

In a third aspect of the invention, there is provided a computer-readable medium comprising instructions which, when executed by a processor, cause the processor to carry out the method of the first aspect of the invention.

In a fourth aspect of the invention, there is provided a processor configured to perform the method of the first aspect of the invention.

In a fifth aspect of the invention, there is provided a computing system comprising: a processor configured to perform the method of the first aspect of the invention; a remote server communicatively coupled to the processor; and a computer communicatively coupled to the processor and the remote server, the computer having one or more output peripherals configured to output the modified user interface and one or more input peripherals for receipt by a human user, wherein the modified user interface is configured for interaction with the human operator via the one or more input peripherals.

In some embodiments, the computing system is a virtual network computing system, the remote server is a VNC server and the computer is a VNC client. The input peripherals may comprise a keyboard and/or a mouse. The output peripherals may comprise a display.

BRIEF DESCRIPTION OF THE DRAWINGS

Embodiments of the invention are described below, by way of example, with reference to the following drawings, in which.

Figure (FIG. 1 depicts a computing system for implementing the invention.

DETAILED DESCRIPTION

Figure 1:
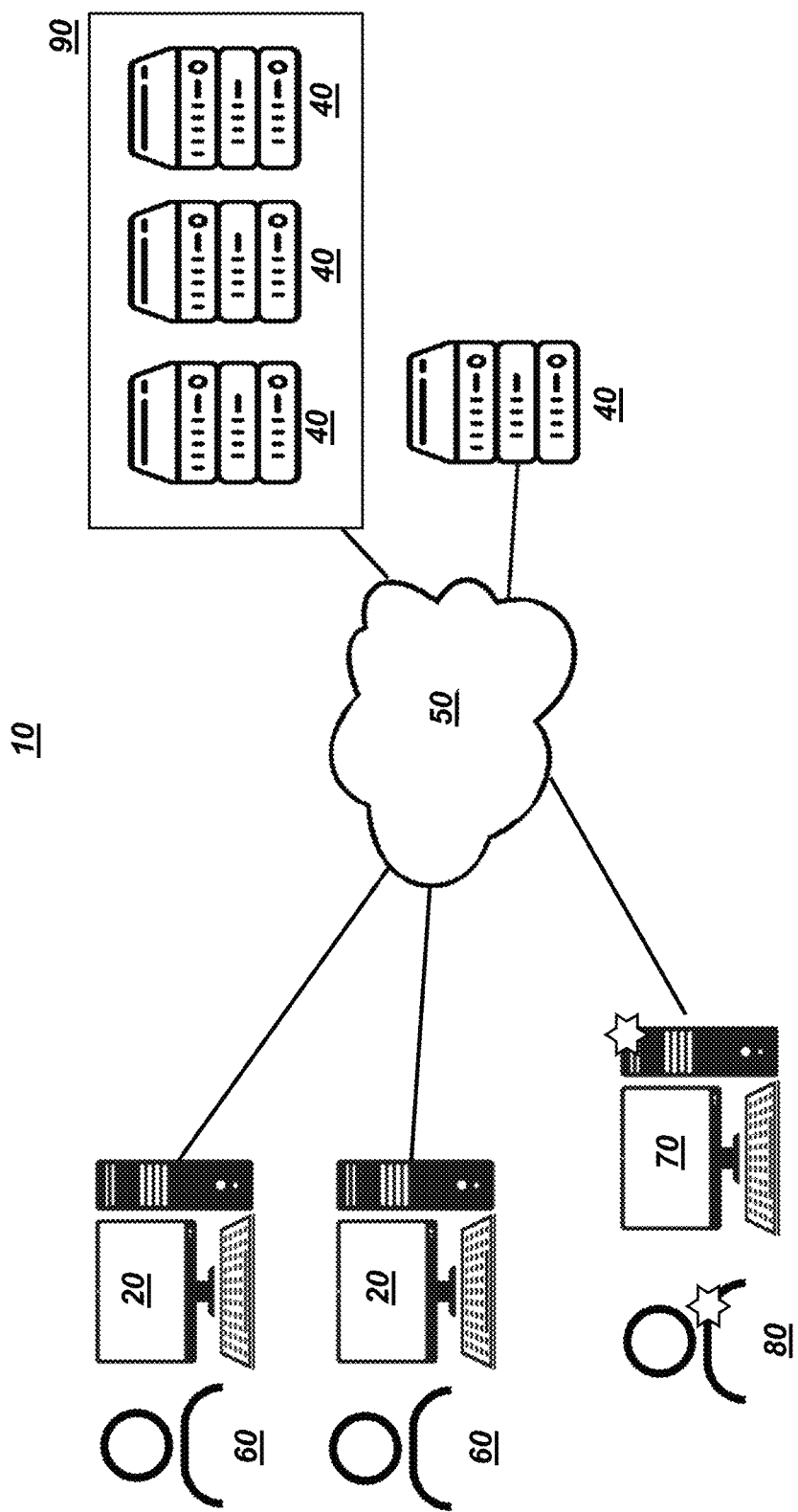

FIG. 1 shows a computing system 10 in which, according to one embodiment, the method of the invention is implemented. Computing system 10 comprises one or more computers 20 which are physically accessible by one or more human operators 60. Computing system 10 also comprises one or more remote servers 40. Remote server 40 is "remote" in that it is located at a different location to computer 20 such that remote server 40 cannot be physically accessed by human operator 60. In some instances, this may be because remote server 40 is a virtual remote server. Computer 20 and remote server 40 are communicatively coupled to one another via at least one communication network 50. This communicative coupling enables data to be communicated between the computer 20 and remote server 40. The at least one communication network 50 may include the internet (i.e., IP, IPv4, IPv6), a cellular network (i.e., 3G, 4G LTE, 5G), a local area network, a cloud network, a wireless network, or any other known communication network. Also present in computing system 10 is an administrator computer 70 which is accessible by a human administrator 80 of the computing system 10. Administrator computer 70 is communicatively coupled to the computer 20 and remote server 40, such that human administrator 80 can maintain and control policies for the interaction between computer 20 and remote server 40. The described computing system 10 is only exemplary and modifications to it, including removing or adding of system components, are possible.

Figure 2:
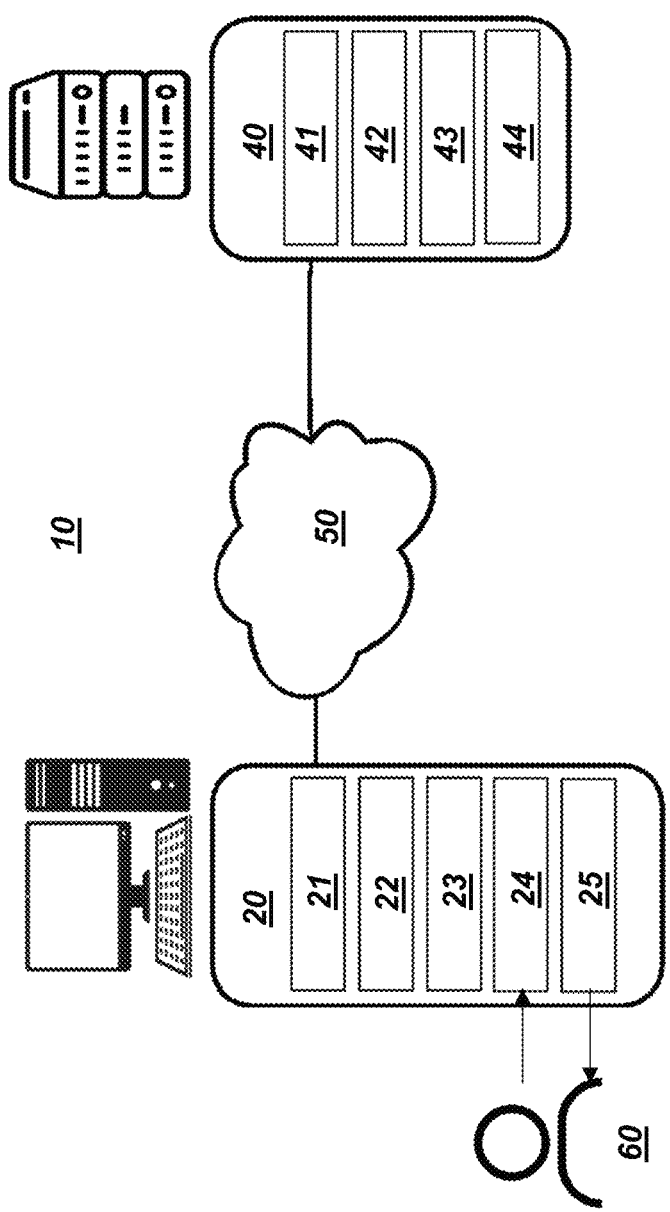
FIG. 2 depicts detailed view of the computing system of FIG. 1.

FIG. 2 shows selected aspects of computing system 10 shown in FIG. 1. Specifically, FIG. 2 shows computer 20 in communication with remote server 40 over communication network 50. Computer 20 comprises one or more software applications 21, processor 22, memory 23, one or more input peripherals 24 and one or more output peripherals 25. Processor 22 includes a central processing unit (CPU) and/or a graphical processing unit (GPU). Memory 23 comprises a data storage device and/or semiconductor memory. The data storage devices takes the form of a hard disks drive, solid state drive, external drive, removable optical disk, and/or memory card. Semiconductor memory takes the form of volatile memory for temporarily storing data, e.g. random-access memory (RAM), and non-volatile memory for storing data long-term, e.g. read-only memory (ROM), Flash memory.

One or more applications 21 are stored as computer programs in memory 23 and are executed on computer 20 via processor 22. These applications, which facilitate direct interaction with human operator 60 via input peripherals 24 and output peripherals 25, include the operating system (OS) and desktop applications. Examples of known operating systems include Microsoft Windows, MacOS, and Linux. Examples of known desktop applications for computer 20' include web browsers such as Google Chrome, documentation applications such as Microsoft Word, and remote access applications, which are discussed further herein. It should be appreciated, however, that the invention is not limited to the specific applications mentioned here.

As mentioned, computer 20 comprises one or more input peripherals 24. The purpose of input peripheral 24 is to enable human operator 60 to send instructions to computer 20. Examples of input peripheral 24 include a mouse, a keyboard, a touch screen, an image scanner, a barcode reader, a game controller, a microphone, a digital camera, a webcam, and the like. Input peripheral 24 may be integrated with computer 20, such as found in laptop computers, or may be external to computer 20, as for desktop computers. Human operator 60 sends instructions to computer 20 using input peripheral 24 by interacting with application 21. In particular, human operator 60 uses input peripheral 24 to interact with a user interface (UI) of application 21. In the case of a graphical user interface (GUI), this interaction is achieved by, for example, pressing a button, clicking, dragging, scrolling, etc. on the GUI via the input peripheral 24.

Computer 20 also comprises one or more output peripherals 25. The purpose of output peripheral 25 is to enable human operator 60 to receive information from computer 20. Examples of output peripheral 25 include a display device (for example, a computer monitor or a projector), a printer, headphones, and computer speakers. Similar to input peripheral 24, output peripheral 25 may be integrated with computer 20 or may be external to computer 20. Human operator 60 receives information from computer 20 using output peripheral 25 by interpreting the UI of application 21 using their senses, such as sight or hearing.

Other components (not shown in FIG. 2) are present in computer 20. For example, computer 20 comprises one or more of: a network adaptor card to enable communication across the communication network 50, a power supply, a motherboard, a sound card, and the like.

FIG. 2 also shows remote server 40. Remote server 40 comprises one or more applications 41, processor 42, memory 43 and machine interface 44. The one or more applications 41 are stored as computer programs in memory 43 and are executed on remote server 40 via processor 42. These applications do not have direct interaction with human operator 60 via input peripherals 24 and output peripherals 25 (although there is indirect interaction via a remote access protocol, as described below). Instead, the one or more applications 41 are applications which interact directly with computer 20 via communication network 50 and machine interface 44. Example applications for remote server 40 include the applications mentioned above for computer 20, and robotic process automation (RPA) applications such as those described in U.S. patent application Ser. No. 14/053,319 and U.S. Pat. No. 10,469,572.

Remote server 40 can take the form of a single server or multiple servers, or alternatively can take the form of a distributed server. Distributed servers operate by distributing processing and data across the constitute components.

Remote server 40 can be a physical remote server or a virtual remote server. When remote server 40 is a virtual remote server, the applications 41, processor 42, memory 43 and machine interface 44 are all virtual entities.

FIG. 1 also shows optional remote platform 90 comprised in computing system 10. Remote platform 90 is a type of physical remote server that hosts one or more virtual remote servers 40. In the same way as remote server 40, remote platform 90 is "remote" in that it is located at a different location to computer 20 such that remote platform 90 cannot be physically accessed by human operator 60. Computer 20 and remote platform 90 are communicatively coupled to one another via at least one communication network 50. This communicative coupling enables data to be communicated between the computer 20 and remote platform 90 (and any of the one or more virtual remote servers 40 hosted thereon). In addition to the one or more virtual remote servers 40, remote platform 90 comprises one or more applications, a processor, a memory and machine interface (not shown). Example applications for remote platform 90 include the applications mentioned above for computer 20 and remote server 40, as well as virtual machine applications to provide the one or more virtual remote servers 40.

Remote Access Protocols

Although, as mentioned above, human operator 60 cannot directly interact with remote server 40, human operator 60 can indirectly interact with remote server 40 via computer 20 using a remote access protocol. In particular, the remote access protocol allows human operator 60 to remotely interact with application 41 on remote server 40. This is achieved by receiving on computer 20, in one form or another, the UI of application 41, so that human operator 60 can interpret the controls that are available in application 41. Human operator 60 then inputs control signals into computer 20 via input peripheral 24, and these control signals are sent from computer 20 to remote server 40 via communication network 50. Consequently, remote server 40 executes the control signals via processor 42 to cause an interaction with application 41 on remote server 40.

Figure 3A:
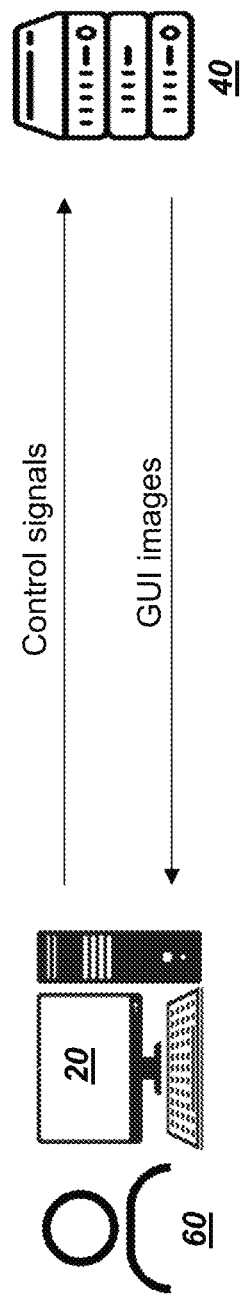
FIG. 3A and FIG. 3B depict example remote access protocols for use with the invention.

There are several known remote access protocols which operate in the way described above that can be used with the invention. A first example of a remote access protocol for use with the invention is the remote framebuffer (RFB) protocol, which is depicted in FIG. 3A. The RFB protocol works on the framebuffer level, which corresponds to rendered GUI images, in this case the rendered GUI images of remote server 40. As a consequence, the RFB protocol can be applied to any application 41 running on remote server 40, including the operating system (i.e. Microsoft Windows, MacOS, etc.) and other applications such as web browsers.

The basic operation of the RFB protocol is as follows. As shown in FIG. 3A, computer 20 receives images of the framebuffer of remote server 40, i.e. rendered GUI images of remote server 40. By "image" it is meant that the data is pixel data. The format and encoding of this pixel data varies as they are negotiated by computer 20 and server 40 to suit the particular scenario in which the RFB protocol is being implemented. These GUI images are sent sequentially and form a 'video' of the GUI of remote server 40 for interpretation by human operator 60 via computer 20. This means that once human operator 60 sends control signals to remote server 40 via input peripheral 24 and computer 20, that human operator 60 can see the consequence of the control signals in subsequent GUI images received from remote server 40. For instance, if the input peripheral 24 is a mouse, and the control signal sent by human operator 60 is to move the mouse, then the human operator 60 would see in subsequently received GUI images that the mouse cursor had been moved on the desktop of remote server 40.

Figure 4:
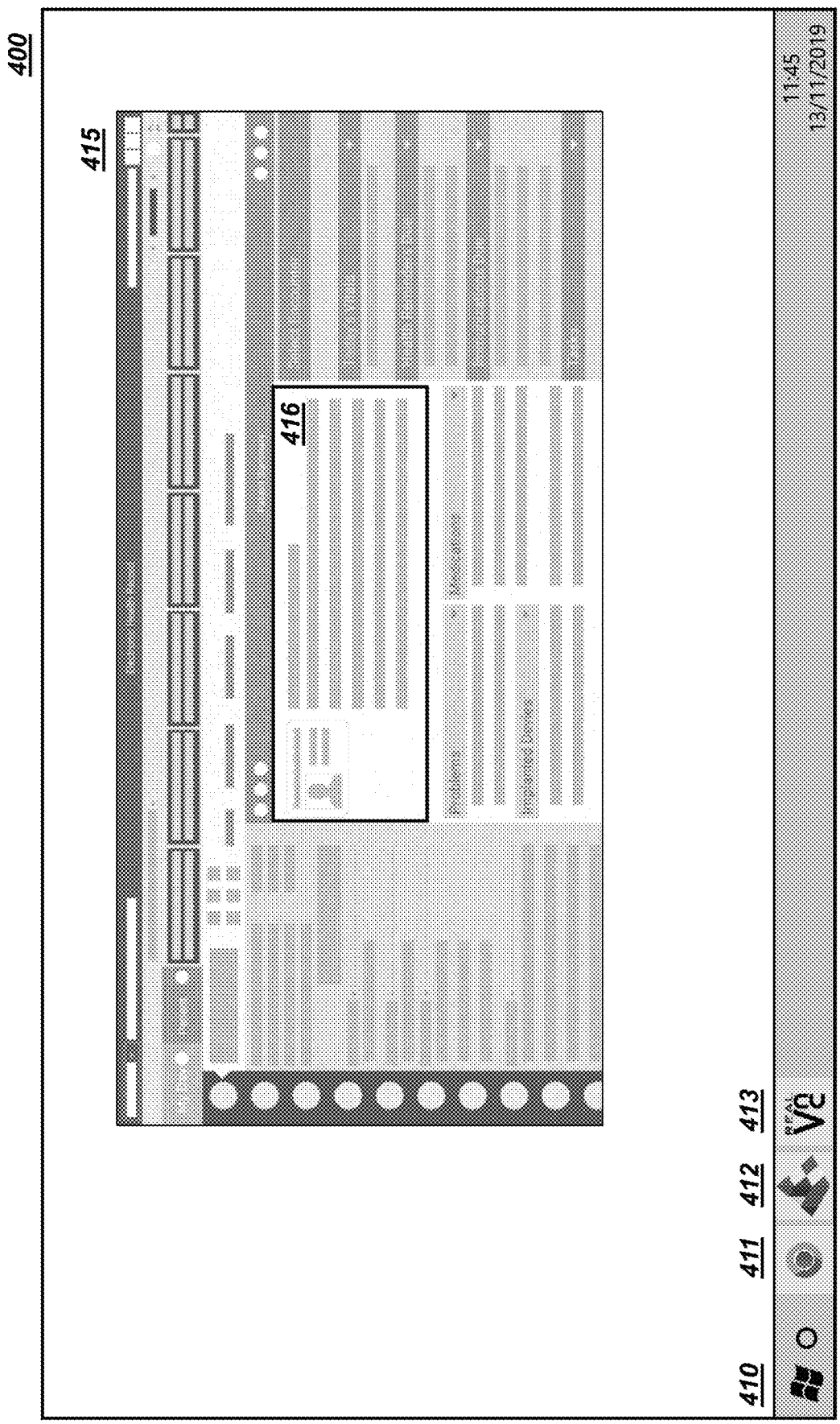
FIG. 4 depicts an example user interface having sensitive data for use with the invention.

A particular example of a GUI image 400 sent by the RFB protocol is shown in FIG. 4. In particular, FIG. 4 depicts the GUI image 400 of the desktop of server 40, which shows a plurality of applications 41, including an operating system 410 (Microsoft Windows), a web browser 411 (Google Chrome), an RPA application 412 (Blue Prism), and a remote access application 413 (Real VNC). The web browser 411 has an open window 415, where an Electronic Health Record which includes sensitive data 416 is being viewed. GUI image 400 is typically sent in its entirety to computer 20 to be viewed by human operator 60. Note that the grey boxes in window 415 of FIG. 4 are used for the simplicity of the figure, and would in the actual GUI image be filled with text.

In the RFB protocol, computer 20 is referred to as the 'client' and remote server 40 is referred to as the 'server'. Thus, on computer 20, application 21 comprises a client remote access application, whilst on server 40, application 41 comprises a server remote access application. Typically, the RFB protocol is implemented using virtual network computing (VNC) applications, such as Real VNC. Thus, remote server 40 may be a VNC server, whilst computer 20 may be a VNC client. Further explanation of the RFB protocol can be found at Richardson, T. and Levine, J., 2011, "The remote framebuffer protocol", IETF.

Figure 3B:
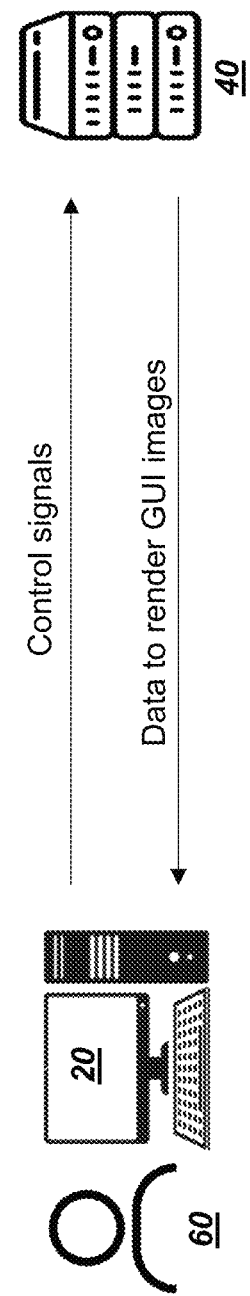

A second example of a remote access protocol for use with the invention is the remote desktop protocol (RDP) by Microsoft, which is shown in FIG. 3B. RDP is similar to the RFB protocol except that, instead of sending the rendered GUI image from remote server 40 to computer 20, data for rendering the GUI image is sent. In other words, in RDP, the data from remote server 40 are not pixel data. Once computer 20 receives the data for rendering the GUI image, the GUI is rendered by computer 20 and displayed on output peripheral 25 for receipt by human operator 60. Additionally, RDP allows human operator 60 to interact with application 41 appearing in the rendered GUI image using operating system commands, including highlighting, copying, etc. In this example, application 21 on computer 20 includes Remote Desktop Connection in order to implement RDP.

Although in the two examples described here the data received by computer 20 relates to the GUI of remote server 40, the invention is not limited to GUIs and may be applied to other types of UI. Moreover, other remote access protocols work with the invention, including the serial line internet protocol (SLIP), Point-to-Point Protocol (PPP), Point-to-Point Over Ethernet (PPPoE), Remote Access Services (RAS), Point-to-Point Tunnelling Protocol (PPTP), and others.

Sensitive Data

As shown in the example of FIG. 4, the UI 400 received from remote server 40 at computer 20 via the remote access protocol can include sensitive data 416. Sensitive data, as referred to herein, are a special type of data which requires heightened security considerations due to its cognitive content. Breaches of sensitive data can result in the accidental or unlawful destruction, loss, alternation, unauthorised disclosure of, or access to, sensitive data, which can have significant human consequences. For example, the permanent deletion of medical records of a person potentially has significant and long-lasting consequences for the health of said person. For this reason, in various jurisdictions, the storage and processing of sensitive data is regulated, for example via General Data Protection Regulation (GDPR) in the European Union, and the Data Protection Act 2018 in the United Kingdom.

Sensitive data takes the form of text or images. Sensitive data may include personal information, i.e. information relating to an identified or identifiable natural person. For example, sensitive data may include a name, an address, a date of birth, a telephone number, an identification document image, a facial image. Other types of sensitive data include location data of a person, an online identifier or one or more factors specific to the physical, physiological, genetic, mental, economic, cultural or social identity of the person. Additionally or alternatively, sensitive data may include financial information, such as credit card numbers, and bank numbers. As a further alternative, sensitive data may include medical information.

Referring back to FIG. 4, an example UI 400 of remote server 40 is depicted which shows sensitive data 416. In particular, FIG. 4 shows the window 415 of a web browser 411 which has open an Electronic Health Record web page containing sensitive data 416. In this example, the sensitive data 416 takes the form of personal information, including an identification document (shown on the left of box 416) which includes a facial image, and personal details such as name, address, date of birth and telephone number (shown on the right of box 416).

Sensitive data received at computer 20 via the remote access protocol are problematic if output to human operator 60 because human operator 60 may not be authorised to view that sensitive data. Further, there is a risk of a data breach via human operator 60. Moreover, access by human operator 60 to this sensitive data is potentially unlawful under the regulations of various jurisdictions. Therefore, a method for preventing sensitive data from being output to human operator 60 is desirable.

Overview of Method

Figure 5:
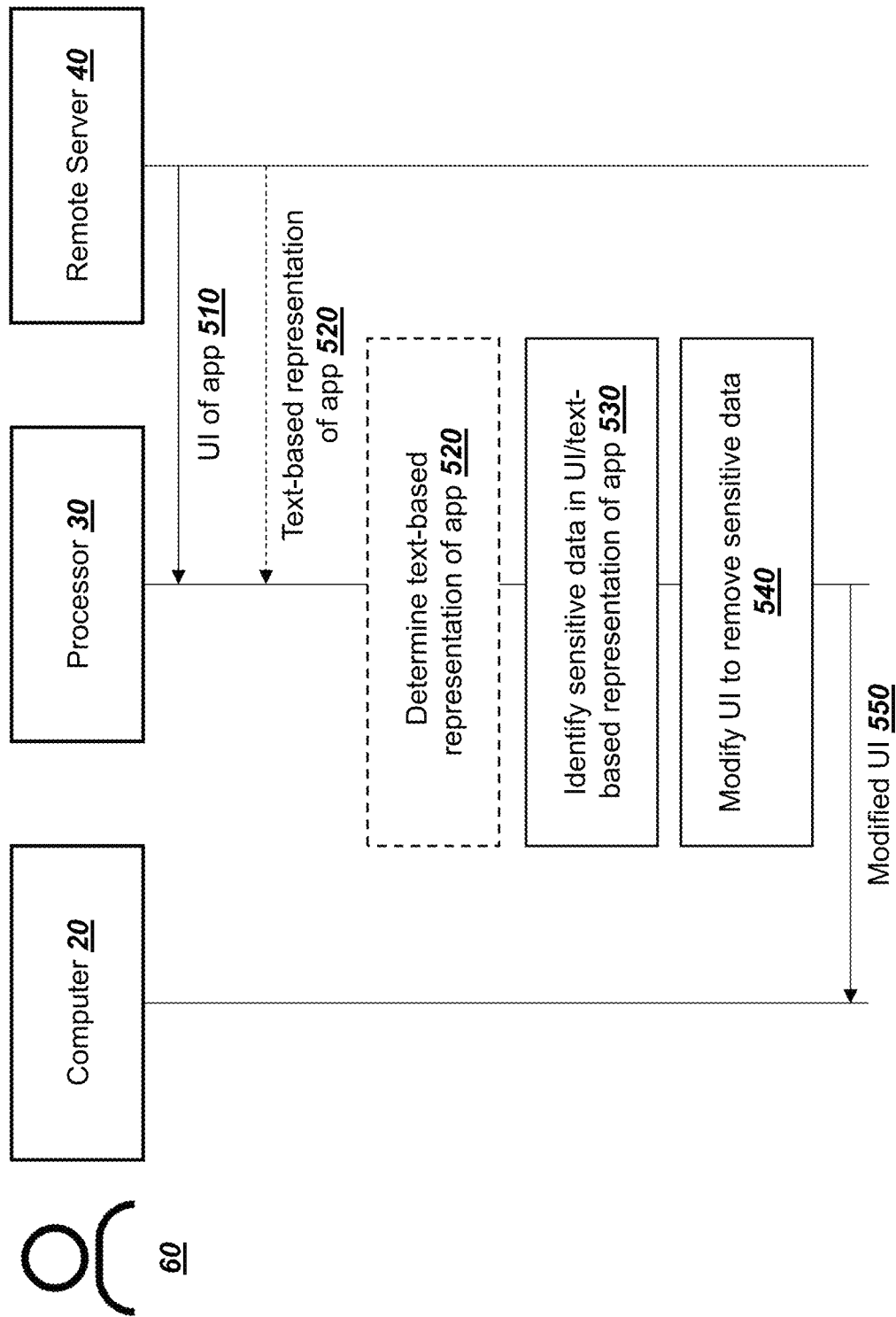
FIG. 5 depicts a flow diagram according to the method of the invention.

FIG. 5 shows the method employed by the invention to prevent sensitive data received via a remote access protocol from being output to human operator 60. The method of FIG. 5 involves computer 20, remote server 40 and processor 30. Processor 30 may be one of processor 22 and processor 42, or a different processor to processor 22 and processor 42. It is preferable that processor 30 is processor 42 of remote server 40 (i.e. the method is performed server-side) to reduce possible security risks. Moreover, processor 30 being processor 42 reduces the computational load for computer 20.

As shown in FIG. 5, the method comprises the following steps which are performed at processor 30:

receiving, from remote server 40 via the remote access protocol, a UI of application 41 executing on remote server 40 (step 510);

determining, or receiving, from remote server 40, a text-based representation of the application 41 (step 520);

identifying sensitive data in the UI and/or the text-based representation of the application 41 using one or more preselected filters (step 530);

modifying the UI to remove the identified sensitive data (step 540);

outputting the modified UI to one or more output peripherals 25 of computer 20 for receipt by human operator 60 (step 550).

Thus, the method of the invention is centred around processor 30, which sits between remote server 40 and human operator 60, and controls what the human operator 60 receives of the UI of application 41. In particular, processor 30 identifies sensitive data using the UI of application 41 and/or a text-based representation of application 41, and consequently modifies the UI to remove the sensitive data in order to output to human operator 60 on computer 20 a UI which does not include sensitive data. In this way, human operator 60 does not have access to the sensitive data on remote server 40 via the remote access protocol, reducing the risk of a data breach.

In further detail, at step 510, processor 30 receives from remote server 40 a UI of application 41 executing on remote server 40. This step in typical for remote access protocols, as described above, except that the UI is received at processor 30 rather than necessarily at computer 20. The form of the UI of application 41 depends on the application and the remote access protocol being used. Application 41 may be any of the applications mentioned herein, including an operating system or other applications such as a web browser, a virtual machine application, an RPA application, etc.

When either a RFB protocol or RDP is used, step 510 involves receiving a desktop GUI of remote server 40 at processor 30. However, in some instances, the application 41 of interest for interaction with human operator 60 will be an application GUI residing on the desktop GUI, such as the web browser 411 in the example of FIG. 4. In these instances, the GUI of the application 41 of interest forms a portion of the desktop GUI. This can be seen in FIG. 4, where window 415 of web browser 411 forms only a portion of the desktop GUI 400.

The next steps, 520 to 550 are discussed in detail in the sections below. In particular, step 520 is discussed in the section titled "text-based application representation". Step 530 is discussed under "filtering and filter customisation". Steps 540 and 550 are discussed in the section named "modified user interface".

Text-Based Application Representation

At step 520, processor 30 either determines a text-based representation of application 41, or receives a text-based representation of application 41 from remote server 40. A text-based representation of application 41 is a representation made up of alphanumeric characters, including letters, digits, punctuation, and other special characters. The letters may be from any writing system (e.g. Latin, Cyrillic, Hangeul, Arabic, Greek, etc.). The digits may be from any numeral system (e.g. Arabic numerals, Chinese numerals, Japanese numerals, Roman numerals). Punctuation and other special characters include, for example, [ ] ! " # $ % & ' ( ) * + , . / : ; < = > ? @ \ ^ _ ` | { } ~ -.

The purpose of the text-based representation of application 41 is to provide additional information about the UI of application 41, which is useful for identifying and subsequently removing sensitive data in the UI of application 41. For instance, the text-based representation of application 41 may reveal that a certain field in the UI of application 41 is a "name" field for a person (e.g. <name="BETTY DIXON">), whereas the UI itself may only reveal the person's actual name (e.g. "BETTY DIXON"), and this name may not be in a form that can be easily extracted (e.g. pixel data rather than text). By specifically referring to "name" and by providing the name text, the text-based representation of application 41 provides additional contextual information which makes the sensitive data easier to identify than using the UI of application 41 alone.

The text-based representation of application 41 can take a number of forms. In some instances, the text-based representation of application 41 comprises text extracted from the UI and/or from application 41. For example, extracting text from GUI image 400 of FIG. 4, would yield the following text:

"Electronic Health Record
My Day Patient
Patent Summary
Problems Medications Implanted Devices
Select Encounter . . .
Today's Vitals
Health Reminders Due
Immunizations Due
Tasks
11:45 13/11/2019"

In addition to the text in window 415 which appears in FIG. 4 as grey boxes.

The text is extracted using Optical Character Recognition (OCR). When using the RFB protocol, the text is extracted by processor 30 using OCR on the GUI image of application 41 sent from remote server 40. When using RDP, text is extracted by processor 30 by identifying natural words and numbers in the data for rendering the GUI image of application 41 sent from remote server 40. Alternatively, when using RDP, text is extracted by processor 30 using OCR on the rendered GUI image of application 41.

In some instances, the text-based representation of application 41 comprises a programmatic representation of application 41. A programmatic representation is a representation which is based on the underlying program of application 41. For example, the programmatic representation of application 41 may be a document object model (DOM) of application 41 or a DOM of the UI of application 41. DOM is an application programming interface for HTML- and XML-based applications. The DOM defines the logical structure of application 41. In particular, tags (such as "name" in the <name="BETTY DIXON"> example above) become element nodes and form the structure of the DOM, whilst text (such as "BETTY DIXON" in the same example) becomes text nodes. The DOM is in the form of text such as JSON or XML, or the like. Further information about DOM is found at Hors, A. et al, 2004, "Document Object Model (DOM) Level 3 Core Specification", *W3C Recommendation*.

When using the RFB protocol, in order to receive the programmable representation of application 41, processor 30 sends a message to remote server 40 in order to request the programmable representation. Alternatively, remote server 40 is programmed to send the programmable representation of application 41 whenever the remote access protocol is in use. As a further alternative, the programmable representation may be determined by processor 30 using the UI of application 41. In the case of the programmable representation being a DOM, processor 30 determines the DOM from GUI image using a deep learning model. One example of a suitable deep learning model for this is "pix2code". When using RDP, the programmable representation of application 41 is determined by processor 30 based on the data for rendering the GUI image sent from remote server 40.

The skilled person will appreciate that forms of text-based representation of application 41, other than those mentioned here, are suitable for use with the invention.

Filtering and Filter Customisation

Step 530 of FIG. 5 is to identify sensitive data in the UI of application 41 and/or the text-based representation of application 41 using one or more preselected filters. The purpose of step 530 is to determine particular portions the UI of application 41 received in step 510 that contain sensitive data so that these portions can be modified in step 540. As mentioned above, sensitive data takes the form of text or images. The preselected filters used for application 41 thus depends on whether the sensitive data are text-based, image-based or both.

When sensitive data takes the form of text, the preselected filter comprises a rule. The text-based representation of application 41 will be parsed to determine if one or more portions of the UI of application 41 satisfy the rule, and thus contains sensitive data. For example, for an application 41 relating to personal data, the rule might determine the presence of country names (e.g. "United Kingdom", "United States of America", "Japan", "South Korea", etc.) as these country names are likely to be the birth country or country of residence of the person, and thus sensitive data. The list of country names may be stored in a database or the like.

DOMs are particularly good in combination with rules. This is because the element nodes of DOMs typically identify the type of information of the corresponding text node. For instance, in the <name="BETTY DIXON"> example mentioned above, the element node "name" identifies that the text node "BETTY DIXON" is a name, which is sensitive data. In this instance, the rule is that if the element node is "name", then the corresponding text node is sensitive data. In this way, sensitive data can easily be identified using the element nodes.

In some instances, the rule may be a regular expression (regex) matching rule. A regular expression, often called a pattern, is an expression used to specify a set of strings in a concise way. This conciseness is achieved using operations, such as "?" which indicates one or no occurrences (e.g. colou?r matches both "color" and "colour"), "{min,max}" which indicates the minimum and maximum number of matches, "[ ]" matches a single character that is contained within the brackets, "^" matches the starting position of the string, "$" matches the ending position of the string, and others. For example, UK postal codes are in the format "area-district sector-unit", for which: area is one or two letters; district is one digit, two digits, or a digit followed by a letter; sector is a single digit; and unit is two letters. For example, "WA2 0XP", "E7 0AQ" and "WC1B 5HA" are all valid UK postal codes. Searching for each possible combination of letters and digits would be cumbersome, so instead the following regular expression is used. A basic regular expression for UK postal codes is:

^[A-Z]{1,2}[0-9][A-Z0-9]? [0-9][A-Z]{2}$ where area is [A-Z]{1,2}, district is [0-9][A-Z0-9]?, sector is [0-9], and unit is [A-Z]{2}. As can be appreciated from this example, searching for a match to this regular expression in the text-based representation of application 41 is much more efficient than searching for each possible combination of letters and digits. Furthermore, regular expressions have a tendency to be suitable for sensitive data as the format of sensitive data is often known.

In some instances, the preselected filter comprises a machine learning model that is configured to identify text. An example machine learning model which is suitable for this purpose is a natural language processing (NLP). NLP models identify sensitive data using Named Entity Recognition (NEP), which seeks to locate and classify named entity mentions in unstructured text into pre-defined categories such as the person names, locations, medical codes, time expressions, quantities, monetary values, percentages, etc. For example, in the sentence "Betty Dixon has an appointment at East London Clinic on 15/11/2019 at 14:50", NEP produces an annotated block of text that highlights the names of entities as follows:

[Betty Dixon]$_{Person}$ has an appointment at [East London Clinic]$_{Location}$ on [15/11/2019]$_{Time}$ at [14:50]$_{Time}$ In this example, a person name, a location name, and two temporal expressions have been detected and classified. NLP models are easy and efficient to train, as well as to run. Thus, where the sensitive data are in the form of text, the sensitive data are preferably identified using NLP models.

When sensitive data are in the form of an image, such as an identification document image or a person's facial image, or when not using the text-based representation of application 41, the preselected filter comprises a machine learning model that is configured to identify an image from the GUI image of application 41. Example machine learning models which are suitable for this purpose are computer vision models. Computer vision models detect the GUI elements (images, text boxes, buttons, icons, drop down lists etc.) that may contain sensitive data using contextual information. For example, a text box next to the label "Name" is considered sensitive data. These GUI elements are detected using object detection algorithms. Moreover, computer vision models are able to detect certain objects such as facial images or identification document images using object detection algorithms.

Once the sensitive data have been identified using the one or more preselected filters, then the location of the sensitive data in the GUI image has to be identified when using the RFB protocol. This is so that that in step 540 the GUI can be modified only at these locations of the GUI image (i.e. only at the pixels pertaining to sensitive data). Location identification of the identified sensitive data is based on the method used to identify the sensitive data. If the sensitive data are identified from the GUI image using a machine learning model, then the machine learning model can also extract the location of the corresponding GUI elements in the GUI image. Otherwise, one or more computer vision models are used to identify the location of GUI elements in the GUI image, the one or more computer vision models used being dependent on what kind GUI element that is being identified. In particular, if the GUI element corresponds to an image (e.g. an identification document image, a facial image), then template matching is used on the GUI image to identify the image location. If the GUI element corresponds to text, then the text box is detected in the GUI image (e.g. using OCR) and then matched against the GUI element. The location of the sensitive data typically takes the form of bounding boxes in the GUI image, which are each defined by the co-ordinates or other pixel reference to the four corners of the respective bounding box.

As mentioned above, one or more preselected filters are used. When more than one preselected filter (i.e. a plurality of preselected filters) is used, each of the plurality of preselected filters is different so that different sensitive data can be identified. When more than one preselected filter is present, there may be more than one type of preselected filter. For example, the preselected filters can include one regular expression matching rule which uses the text-based representation of application 41, and one machine learning model which uses the GUI image of application 41.

Typically, the likely content of application 41 is known before the remote access protocol is put into use, thus filters are preselected to identify the sensitive data that is expected in the content of application 41. Put another way, the one or more preselected filters are customised according to the content of application 41. For example, if application 41 is a web browser which often contains medical and personal information because remote server 40 is part of a medical facility, then filters are preselected to identify this medical and personal information. Conversely, if application 41 is a webcam application, then a filter is preselected to identify facial images. To this end, the method of the invention optionally comprises, prior to the step of receiving, preselecting one or more filters based on sensitive data in the application.

Administrative computer 70 and human administration 80 of FIG. 1 maintain and control policies for the interaction between computer 20 and remote server 40, thus the one or more preselected filters may be preselected by human administrator 80 using administrative computer 70. To this end, administrative computer 70 can contain a database of filters, to allow human administrator 80 to customise the one or more preselected filters for the content of application 41. In order for human administrator 80 to select the appropriate one or more filters, administrative computer 70 comprises an UI to set the one or more filters. For example, the UI may be a GUI that can be used to add filters. The one or more preselected filters are then stored in a config file. Optionally, the config file can also dictate how to modify certain types of sensitive data in step 540. For example, the config file may contain directs that specify "look for National Insurance Numbers and blur the field".

Modified User Interface

In steps 540 and 550 of FIG. 5, the UI received in step 510 is modified to remove the sensitive data identified in step 530 to form a modified UI. The term "remove" in this context can mean either exorcise or obscure. This modified UI is output to one or more output peripherals 25 of computer 20 for receipt by human operator 60.

In further detail, for step 540, the method used for modifying the UI to remove sensitive data depends on the remote access protocol used. This is because the form of the UI received in step 510 from remote server 40 is dictated by the remote access protocol. For example, when the remote access protocol is the RFB protocol, the received UI is in the form of a GUI image, so step 540 comprises modifying a GUI image. In another example, when the remote access protocol is RDP, the received UI is in the form of data for rendering a GUI image, such that step 540 comprises modifying the data for rendering a GUI image.

Figure 6A:
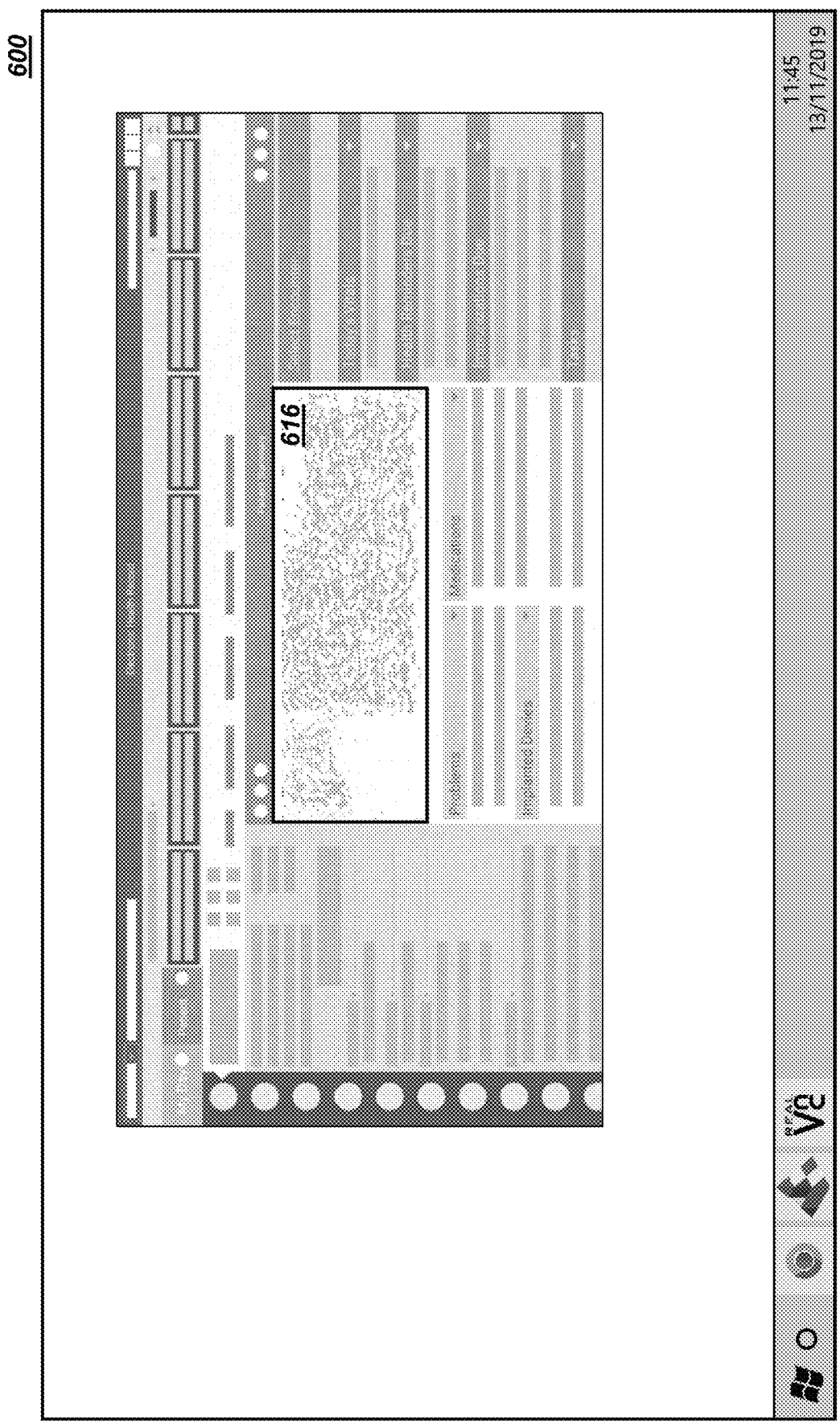
FIG. 6A and FIG. 6B each depict an example modified user interfaces based on the user interface of FIG. 4.

There are several approaches that can be used for modifying a GUI image (i.e. when using the RFB protocol). One approach is to use one or more image transforms in order to manipulate the pixels pertaining to sensitive data such that the sensitive data can no longer interpreted by human operator 60. For instance, the GUI image may be blurred at locations in the GUI image in which sensitive data have been identified. The amount of blurring has to be sufficient to make the sensitive data uninterpretable to human operator 60. An example of GUI image blurring is shown in the GUI image 600 of FIG. 6A, which corresponds to the GUI image 400 of FIG. 4. As shown in FIG. 6A, the box 616, which corresponds to box 416 of FIG. 4 that contains personal information including an identification document and personal details, has been blurred such that the sensitive data are no longer interpretable by human operator 60.

Figure 6B:
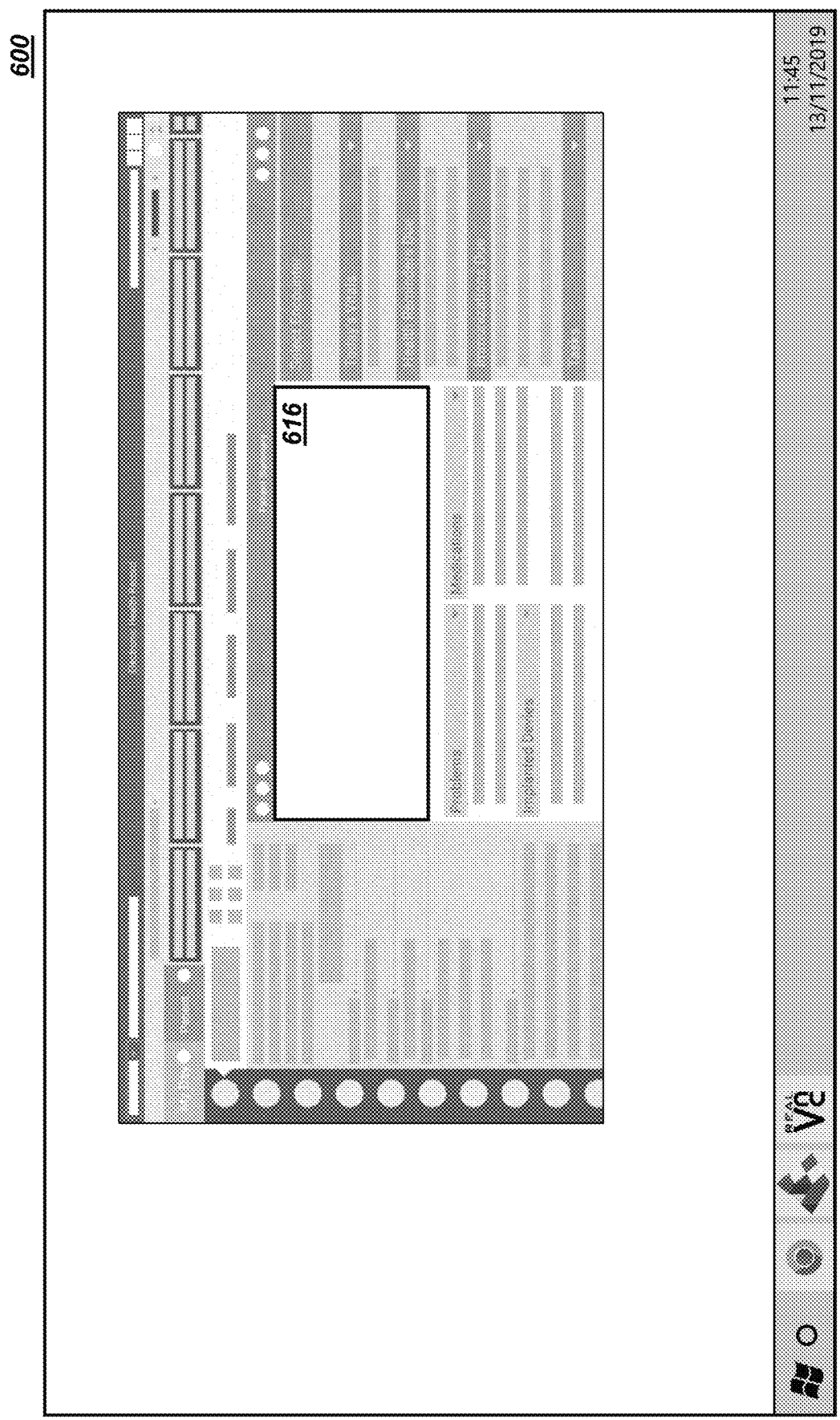

An alternative image transform to applying a blur is to apply a solid colour at locations in the GUI image in which sensitive data have been identified. An example of GUI image with solid colour applied is shown in the GUI image 600 of FIG. 6B. In particular, as shown in FIG. 6B, the solid colour white has been applied to box 616 such that the sensitive data are no longer interpretable by human operator 60. Other solid colours may alternatively be used. In some instances, the solid colour chosen is based on the background colour of application 41 so that human operator 60 may not realise that the UI has been modified. A further alternative image transform is to decrease the image resolution (i.e. increasing pixelisation of the GUI image). The skilled person will appreciate that any image transform which means that the sensitive data can no longer be interpreted by human operator 60 is suitable for the method of the invention.

There are several approaches that can be used for modifying the data for rending a GUI image (i.e. when using RDP). In general, these approaches edit the data to remove the sensitive data, which is usually in the form of text or an image, such that the rendered GUI image does not contain the sensitive data. This is done so that human operator 60 cannot interact with application 41 appearing in the rendered GUI image using operating system commands (e.g. highlighting and copying) to extract the sensitive data. When the sensitive data are in the form of text, an example approach is to replace the characters of the text with random characters or asterisks. For example, if the sensitive data to be removed is a name, the name "BETTY DIXON" may become random characters such as "DLNN1 56OLP" or "*** *". Alternatively, the characters may be replaced by blank spaces so that human operator 60** might not realise that the UI has been modified. When the sensitive data are in the form of an image, then the image file may be exorcised from the data. To do this, the image file would be identified in the data by the file extension (for example, .tiff, .jpg, .gif, .png, etc.), and then removed from the data. Alternatively, one or more of the image transforms previously mentioned may be used to obscure the sensitive data in the image.

In general, methods which are not computationally intensive are preferred for modifying the UI to remove sensitive data as this ensures that the time taken between processor 30 receiving the UI in step 510 and outputting the modified UI in step 550 is minimal. This ensures that the UI of remote server 40 responds quickly to inputs of human operator 60, and thus does not have high latency.

The form of the modified UI also depends on the remote access protocol being used. This is because the modified UI takes the same form as the UI received in step 510 from remote server 40. For the RFB protocol, the received UI is in the form of a GUI image, thus the output to computer 20 is modified UI is in the form of a GUI image. For RDP, the received UI is in the form of data for rendering a GUI image, such the output to computer 20 is modified data so as to render a modified GUI image.

Once the modified UI has been output to human operator 60 via output peripherals 25 of computer 20, human operator 60 can interact with the modified UI in the same way as they would have interacted with the original, unmodified UI when not using the method of the invention. In other words, human operator 60 can interact with application 41 on the modified UI using input peripherals 24. Since modifications made to the UI are specific to the type of remote access protocol, this ensures that human operator 60 cannot gain access to the sensitive data by interacting with the modified UI using input peripherals 24. For example, in the case of an RFB protocol, the UI is a GUI image, and because this image has been altered, human operator 60 is not able to access the sensitive data. In the case of RDP, the data for rendering a GUI image are altered such that the sensitive data are removed from the rendering of application 41, meaning that human operator 60 cannot highlight and copy sensitive data (e.g. using the copy command in the operating system).

For the purpose of completeness, it is noted that the original, unmodified UI is not output to the one or more output peripherals 25 of computer 20. This would cause sensitive data to be revealed to human operator 60 and therefore defeat the purpose of the invention.

Example

The disclosed method of preventing sensitive data received via a remote access protocol from being output to human operator 60 is useful for various implementations of remote access protocols. For example, for outsourced technical support it is often the case that human operator 60 (i.e. the technical support staff member) is not authorised to see sensitive data on remote server 40. Nevertheless, human operator 60 must connect to remote server 40, via their computer 20 and a remote access protocol, to provide technical support to remote server 40. Advantageously, by implementing the disclosed method, human operator 60 would not see the sensitive data but would still be able to provide technical support.

One particular implementation of remote access protocols for use with the disclosed method involves Robotic Process Automation (RPA). RPA uses automated processes which mimic the interaction that a human operator would have had with the user interface (e.g. the GUI) of an application. In this way, the automated processes can be thought of as a virtual operator. Interaction with an application in this way is necessary for applications that cannot be interacted with using only a machine interface, such as applications that do not have APIs.

The automated processes in RPA are implemented using virtual machines, each virtual machine having their own virtual desktop for interaction with a virtual operator. Typically, there are a plurality of virtual machines running on one physical server in parallel which perform the same or similar automated processes on an application. This ensures that less physical hardware is required compared to using human operators (where one physical computer is required per human operator). RPA delivers secure and accurate interactions with application because there is no need for a human operator or human discretion. Thus, by using virtual operators instead of human operators to interact with applications, there is improved data security as the likelihood of a data breach is reduced. Further information about RPA can be found in U.S. patent application Ser. No. 14/053,319 and U.S. Pat. No. 10,469,572.

Sometimes in RPA it is useful for human operator 60 to check that the virtual machine is operating correctly in order to debug and the like. However, because virtual machines are usually headless in the sense that they do not have a connected display device, and because virtual machines tend to be remote from human operator 60, the best way for human operator 60 to access a virtual machine is by a remote access protocol. However, this is problematic because the human operator 60 is able to see all of the data on the virtual desktop of the virtual machine, including sensitive data. This reduces the security of RPA dramatically. The method of the invention for preventing sensitive data received from being output to human operator 60 is therefore useful for RPA.

Figure 7:
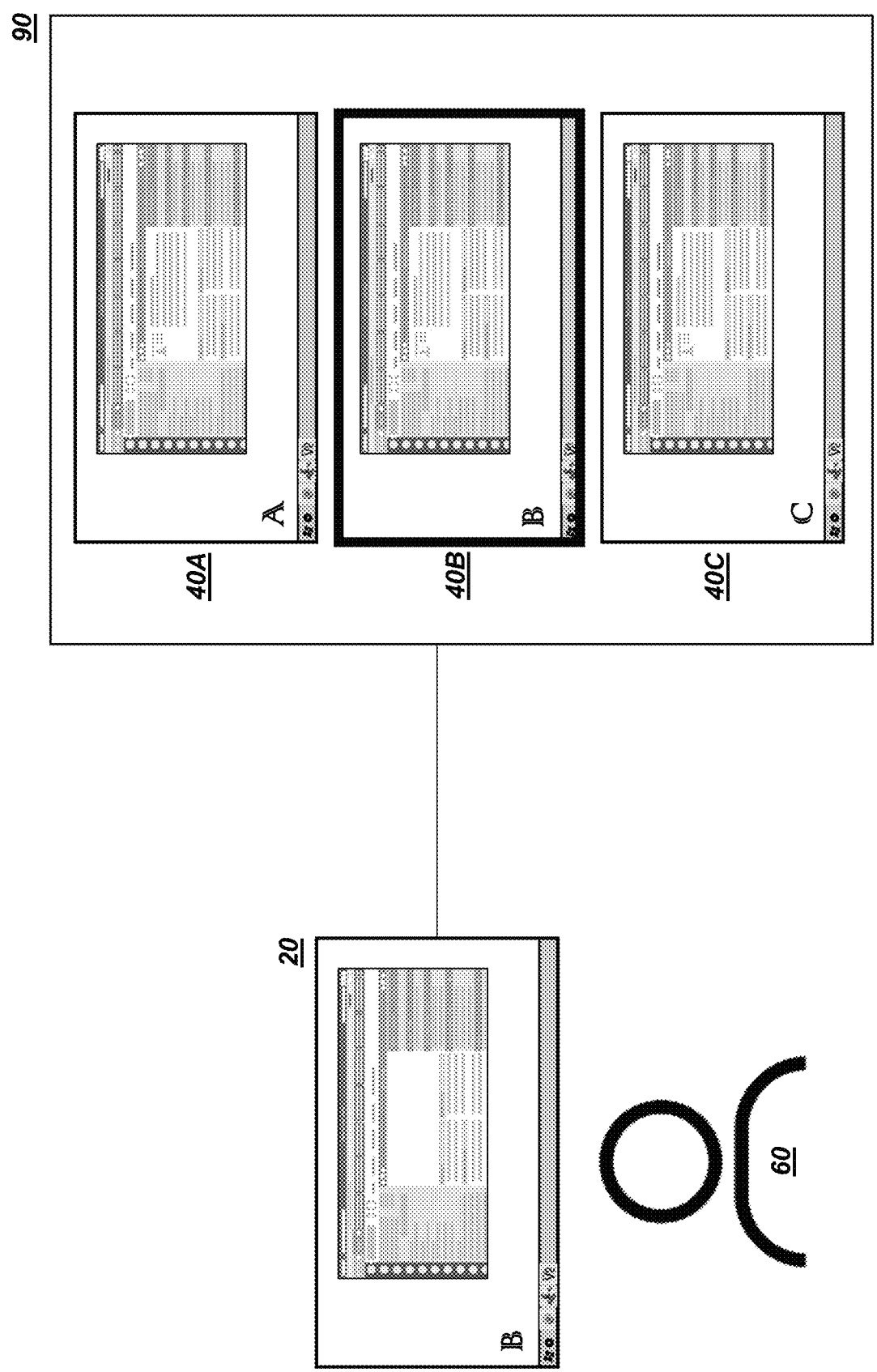
FIG. 7 depicts an example implementation of the method of the invention in Robotic Process Automation (RPA).

FIG. 7 shows an RPA implementation of the method of the invention. In FIG. 7, remote server 40 is a virtual remote server in the form of a virtual machine. Thus, remote server 40 is capable of performing automatic processes on application 41. In particular, the automated processes are performed by a virtual operator of the virtual machine using the user interface of application 41. Typically, there is no involvement by human operator 60, and it is not possible for human operator 60 to directly see the automated processes being performed by virtual operator as the virtual machine is headless and remote from human operator 60.

When human operator 60 wishes to see the automated processes being performed by a virtual operator on the virtual machine (e.g. one of remote server 40C, 40B, 40C), they do so via their computer 20 and the remote access protocol. Typically, there is a plurality of virtual machines, as shown in FIG. 7 by remote servers 40A, 40B and 40C, hosted by remote platform 90. Human operator 60 can select which of the virtual machines he or she wishes to interact with via computer 20 using RPA application 21. The remote desktop application 41 is able to send to computer 20 the user interface of the virtual desktop of the selected virtual machine (including the user interface of an application 41). However, due to the method of the invention, processor 30 (not shown in FIG. 7) ensures that sensitive data is removed from the user interface before it is output to human operator 60 on computer 20.

For example, as shown in FIG. 7, human operator 60 has selected remote server 40B of remote platform 90 and can therefore see and interact with the user interface of remote server 40B via computer 20. In particular, human operator 60 will see the automated processes interacting with application 41 on the virtual machine, which in this example is a web browser. However, because user interface of remote server 40B contains sensitive data, this sensitive data has been removed in the user interface output to human operator 60 via computer 20 (seen by comparing the respective user interfaces). Accordingly, the security level prior to involvement of human operator 60 is maintained.

General

When implemented in software, the invention can take the form of a computer program. The computer program may be embodied as a computer-readable medium having computer executable code for use by or in connection with a processor. A computer-readable medium is any tangible device that can contain, store, communicate, propagate, or transport the program for use by or in connection with a processor. Moreover, a computer-readable medium can be an electronic, magnetic, optical, electromagnetic, infrared, or semiconductor device or a propagation medium. Examples of a computer-readable medium include a semiconductor memory, a random access memory (RAM), a read-only memory (ROM), a Flash memory, a hard disk drive, a solid state drive, an optical disk, and memory cards. Current examples of optical disks include CDs, DVDs, and Blu-Rays. Current examples of memory cards include USB flash drives, SD cards, microSD cards, MMC cards, xD cards, and memory sticks.

When implemented in hardware, the invention is not limited to the specific hardware described herein. The skilled person would appreciate that the invention can be implemented on different hardware than computer 20 and remote server 40 and still function in the way described.

The flow diagrams in the figures illustrate the architecture, functionality, and operation of possible implementations of the methods of the invention. In some alternative implementations, the steps noted in the figures may occur out of the order noted in the figures. For example, two steps shown in succession may, in fact, be performed substantially concurrently, or the blocks may sometimes be performed in the reverse order, depending upon the functionality involved.

It will be understood that the above description of is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

Embodiments

The following list provides embodiments of the invention and forms part of the description. These embodiments can be combined in any compatible combination beyond those expressly stated. The embodiments can also be combined with any compatible features described herein:

Embodiment 1. A computer-implemented method of preventing sensitive data received via a remote access protocol from being output to a human operator, the method comprising: receiving, from a remote server via a remote access protocol, a user interface of an application executing on the remote server; determining, or receiving from the remote server, a text-based representation of the application; identifying sensitive data in the user interface and/or the text-based representation of the application using one or more preselected filters; modifying the user interface to remove the identified sensitive data; outputting the modified user interface to one or more output peripherals of a computer for receipt by the human operator.

Embodiment 2. The method of embodiment 1, wherein the remote access protocol is provided by a remote access application.

Embodiment 3. The method of embodiment 1 or 2, wherein the remote access protocol is a remote framebuffer protocol.

Embodiment 4. The method of embodiment 3, wherein the received user interface is in the form of an image of the user interface, the step of modifying comprising modifying the image of the user interface, and the step of outputting comprising outputting the modified image of the user interface.

Embodiment 5. The method of embodiment 3 or 4, wherein the remote server is a virtual network computing (VNC) server, and the computer is a VNC client.

Embodiment 6. The method of embodiment 1 or 2, wherein the remote access protocol is a remote desktop protocol.

Embodiment 7. The method of embodiment 6, wherein the received user interface is in the form of data for rendering an image of the user interface, the step of modifying comprising modifying the data for rendering an image of the user interface, and the step of outputting comprises outputting the modified data to render an image of a modified user interface.

Embodiment 8. The method of any preceding embodiment, further comprising, prior to the step of determining, or receiving from the remote server, preselecting one or more filters based on sensitive data in the application.

Embodiment 9. The method of embodiment 8, wherein the sensitive data includes personal information.

Embodiment 10. The method of embodiment 9, wherein the personal information comprises one or more of: a name, an address, a date of birth, a telephone number, an identification document image, a facial image.

Embodiment 11. The method of any of embodiments 8 to 10, wherein the sensitive data includes financial information.

Embodiment 12. The method of embodiment 11, wherein the financial information comprises one or more of: credit card numbers, bank numbers.

Embodiment 13. The method of any of embodiments 8 to 12, wherein the sensitive data includes medical information.

Embodiment 14. The method of any preceding embodiment, wherein the step of receiving a user interface comprises receiving a user interface of a desktop of the remote server, the user interface of the application forming a portion of the user interface of the desktop.

Embodiment 15. The method of any preceding embodiment, wherein the text-based representation of the application comprises text extracted from the user interface and/or the application.

Embodiment 16. The method of any preceding embodiment, wherein the text-based representation of the application comprises a programmatic representation of the application.

Embodiment 17. The method of embodiment 16, wherein the programmatic representation comprises a document object model of the application.

Embodiment 18. The method of any preceding embodiment, wherein the preselected filter comprises a rule.

Embodiment 19. The method of any preceding embodiment, wherein the preselected filter comprises a regular expression matching rule.

Embodiment 20. The method of any preceding embodiment, wherein the preselected filter comprises a machine learning model.

Embodiment 21. The method of embodiment 20, wherein the machine learning model is configured to identify text.

Embodiment 22. The method of embodiment 20, wherein the machine learning model is configured to identify an image.

Embodiment 23. The method of any preceding embodiment, wherein the modified user interface is configured for interaction with the human operator via one or more input peripherals of the computer.

Embodiment 24. The method of any preceding embodiment, wherein the user interface is a graphical user interface.

Embodiment 25. The method of any preceding embodiment, wherein the unmodified user interface is not output to the to one or more output peripherals of the computer.

Embodiment 26. The method of any preceding embodiment, wherein the application is a web browser.

Embodiment 27. A computer program comprising instructions which, when the program is executed by a processor, cause the processor to carry out the method of any preceding embodiment.

Embodiment 28. A computer-readable medium comprising instructions which, when executed by a processor, cause the processor to carry out the method of any of embodiments 1 to 26.

Embodiment 29. A processor configured to perform the method of any of embodiments 1 to 26.

Embodiment 30. A computing system comprising: a processor configured to perform the method of any of embodiments 1 to 26; a remote server communicatively coupled to the processor; and a computer communicatively coupled to the processor and the remote server, the computer having one or more output peripherals configured to output the modified user interface and one or more input peripherals for receipt by a human user, wherein the modified user interface is configured for interaction with the human operator via the one or more input peripherals.

Embodiment 31. The computing system of embodiment 30, wherein the computing system is a virtual network computing system, the remote server is a VNC server and the computer is a VNC client.

Embodiment 32. The computing system of embodiment 30 or 31, wherein the input peripherals comprise a keyboard and/or a mouse.

Embodiment 33. The computing system of any of embodiments 30 to 32, wherein the output peripherals comprise a display device.

What is claimed is:

1. A computer-implemented method of preventing sensitive data received via a remote access protocol from being output to a human operator, the method comprising:
receiving, by a processor, from a virtual remote server via a remote desktop protocol, data for rendering an image of a user interface of an application executing on the virtual remote server, wherein the virtual remote server is a virtual machine and wherein automated processes are performed on the application as if by a virtual operator of the virtual machine using the user interface of the application;

determining, by the processor, or receiving from the virtual remote server to the processor, a programmatic text-based representation of the application that is executing on the virtual remote server based on the data for rendering the image of the user interface sent from the virtual remote server;

identifying, by the processor, sensitive data in the programmatic text-based representation of the application using one or more preselected filters;

modifying, by the processor, the data for rendering an image of the user interface received from the virtual remote server to remove the identified sensitive data;

outputting, by the processor, the modified data to render an image of a modified user interface to one or more output peripherals of a computer for receipt by the human operator, wherein the computer is communicatively coupled to the processor and the virtual remote server, wherein the computer having one or more input peripherals for receipt by a human user, and wherein the modified user interface is configured for interaction with the human operator via the one or more input peripherals.

2. The method of claim 1, further comprising, prior to the step of determining, or receiving from the virtual remote server, preselecting one or more filters based on sensitive data in the application.

3. The method of claim 1, wherein the step of receiving a user interface comprises receiving a user interface of a desktop of the virtual remote server, the user interface of the application forming a portion of the user interface of the desktop.

4. The method of claim 1, wherein the text-based representation of the application comprises text extracted from the user interface and/or the application.

5. The method of claim 1, wherein the programmatic representation comprises a document object model of the application.

6. The method of claim 1, wherein the preselected filter comprises a rule.

7. The method of claim 1, wherein the preselected filter comprises a machine learning model.

8. The method of claim 7, wherein the machine learning model is configured to identify text.

9. The method of claim 7, wherein the machine learning model is configured to identify an image.

10. The method of claim 1, wherein the user interface is a graphical user interface.

11. The method of claim 1, wherein the unmodified user interface is not output to the to one or more output peripherals of the computer.

12. The method of claim 1, wherein the application is a web browser.

13. A computer-readable, non-transitory medium comprising instructions which, when the program is executed by a processor, cause the processor to carry out the method of claim 1.

14. A computing system comprising:
the processor, the virtual remote server, and the computer configured to perform the method of claim 1.

15. A computer-implemented method of preventing sensitive data received via a remote access protocol from being output to a human operator, the method comprising:

receiving, by a processor, from a virtual remote server via a remote desktop protocol, data for rendering an image of a user interface of an application executing on the remote server, wherein the virtual remote server is a virtual machine and wherein automated processes are performed on the application as if by a virtual operator of the virtual machine using the user interface of the application;

extracting by the processor via the remote desktop protocol, a text-based representation of the application that is executing on the virtual remote server based on the data for rendering the image of the user interface sent from the virtual remote server;

identifying, by the processor, sensitive data in the text-based representation of the application using one or more preselected filters;

modifying, by the processor, the data for rendering an image of the user interface received from the virtual remote server to remove the identified sensitive data;

outputting, by the processor, the modified data to render an image of a modified user interface to one or more output peripherals of a computer for receipt by the human operator.

* * * * *